US007971259B2

(12) United States Patent
Korkishko et al.

(10) Patent No.: US 7,971,259 B2
(45) Date of Patent: Jun. 28, 2011

(54) DEVICE AND METHOD FOR ESTABLISHING TRUSTED PATH BETWEEN USER INTERFACE AND SOFTWARE APPLICATION

(75) Inventors: Tymur Korkishko, Suwon-si (KR); Kyung-hee Lee, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 932 days.

(21) Appl. No.: 11/506,890

(22) Filed: Aug. 21, 2006

(65) Prior Publication Data

US 2007/0150733 A1 Jun. 28, 2007

(30) Foreign Application Priority Data

Dec. 23, 2005 (KR) ........................ 10-2005-0128934

(51) Int. Cl.
*G06F 7/04* (2006.01)
*G06F 17/30* (2006.01)
*H04N 7/16* (2006.01)

(52) U.S. Cl. ................ 726/26; 726/27; 726/28; 726/29; 726/30; 713/164; 713/168; 713/169

(58) Field of Classification Search .................. 713/164, 713/168, 169
See application file for complete search history.

(56) References Cited

U.S. PATENT DOCUMENTS 7,024,564 B2 * 4/2006 Pavlin et al. .................. 713/192
7,092,495 B2 * 8/2006 Kraft et al. .................. 379/88.11
7,159,122 B2 * 1/2007 Lundvall et al. .............. 713/189
7,181,008 B1 * 2/2007 Kamibayashi et al. ......... 380/22
7,257,718 B2 * 8/2007 Lundvall et al. .............. 713/193
7,356,710 B2 * 4/2008 Lundvall et al. .............. 713/193
7,502,633 B2 * 3/2009 Engstrom et al. ............. 455/566
7,516,323 B2 * 4/2009 Inoue et al. ................... 713/164
7,606,043 B2 * 10/2009 Stokholm et al. ............. 361/752
7,693,556 B2 * 4/2010 Park et al. .................. 455/575.1
2001/0032088 A1 * 10/2001 Utsumi et al. .................... 705/1
2002/0159592 A1 * 10/2002 Matsushima et al. ......... 380/201
2002/0184046 A1 * 12/2002 Kamada et al. ................... 705/1
2004/0085370 A1 * 5/2004 Cibelli et al. ................. 345/864
2004/0181708 A1 * 9/2004 Rothman et al. ................ 714/10
2004/0230797 A1 * 11/2004 Ofek et al. .................... 713/168

OTHER PUBLICATIONS

Langweg, H., Building a Trusted Path for Applications Using COTS Components, Apr. 19-20, 2004, p. 21-1 ot 21-14.*

* cited by examiner

*Primary Examiner* — Matthew B Smithers
*Assistant Examiner* — Jing Sims
(74) *Attorney, Agent, or Firm* — NSIP Law

(57) ABSTRACT

A device and a method for establishing a trusted path between a user interface and a software application to securely execute the software stored in a memory along the trusted path and offer the user's desired service are provided. Accordingly, the trusted path is established so that attackers can not invade a normal path between the user interface and software. Additionally, the device securely executes the original software which is not fabricated so that the user can receive desired services from the device.

10 Claims, 2 Drawing Sheets

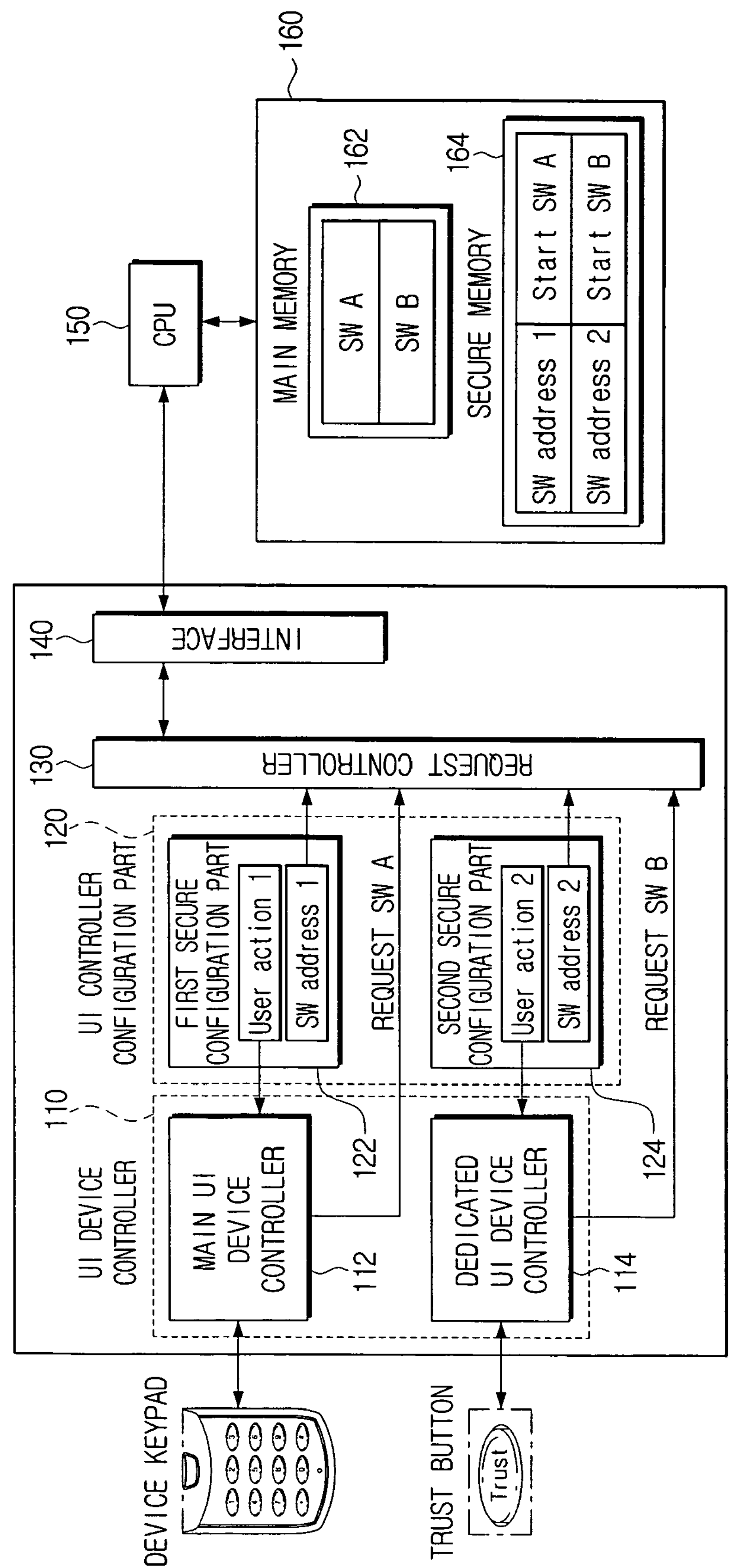
FIG. 1
DEVICE KEYPAD
TRUST BUTTON
Trust
UI DEVICE CONTROLLER
110
MAIN UI DEVICE CONTROLLER
112
DEDICATED UI DEVICE CONTROLLER
114
UI CONTROLLER CONFIGURATION PART
120
FIRST SECURE CONFIGURATION PART
User action 1
SW address 1
122
SECOND SECURE CONFIGURATION PART
User action 2
SW address 2
124
REQUEST SW A
REQUEST SW B
REQUEST CONTROLLER
130
INTERFACE
140
CPU
150
160
MAIN MEMORY
162
SW A
SW B
SECURE MEMORY
164
SW address 1
Start SW A
SW address 2
Start SW B

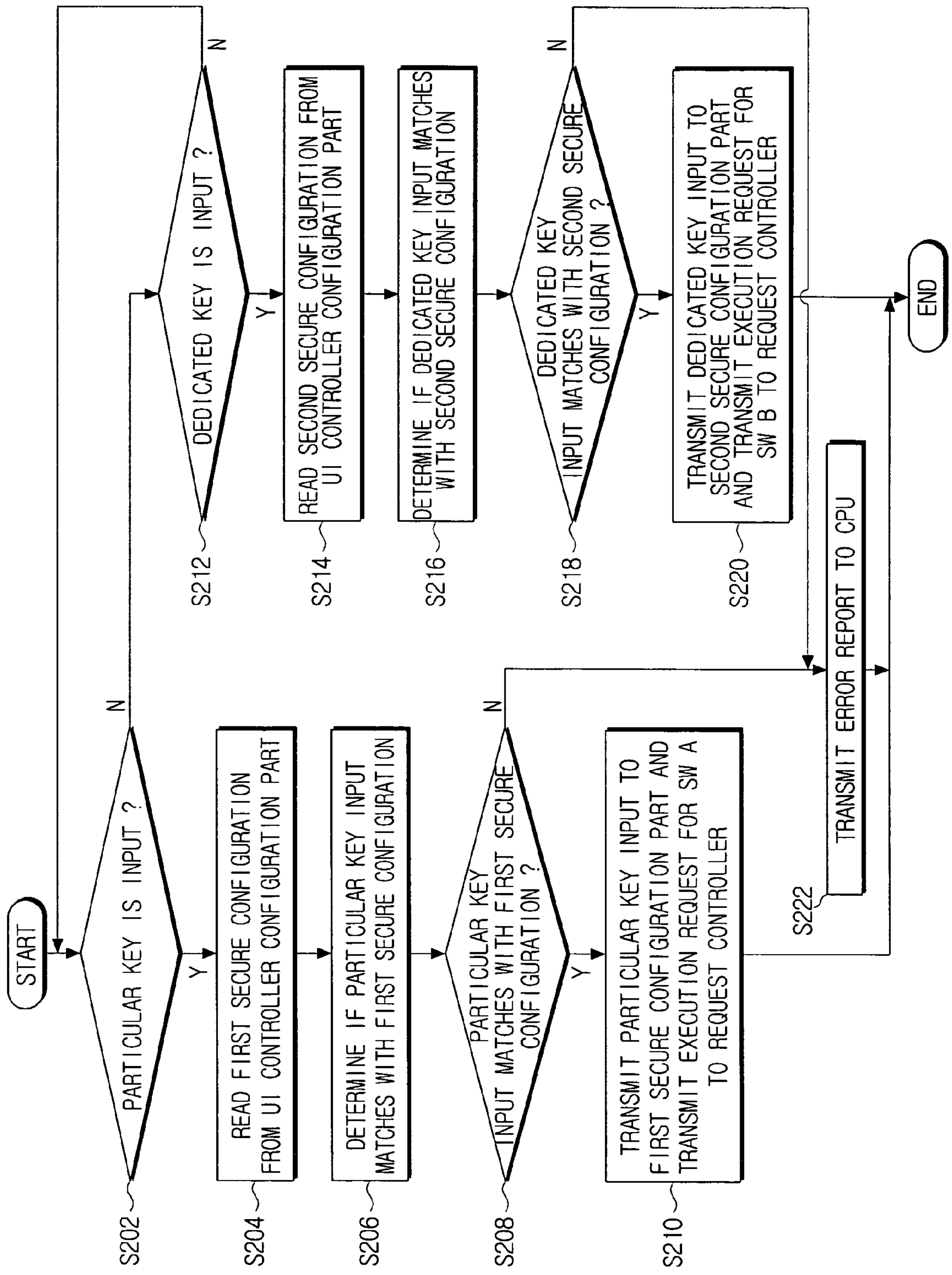
FIG. 2
START
PARTICULAR KEY IS INPUT ?
S202
Y
N
READ FIRST SECURE CONFIGURATION FROM UI CONTROLLER CONFIGURATION PART
S204
DETERMINE IF PARTICULAR KEY INPUT MATCHES WITH FIRST SECURE CONFIGURATION
S206
PARTICULAR KEY INPUT MATCHES WITH FIRST SECURE CONFIGURATION ?
S208
TRANSMIT PARTICULAR KEY INPUT TO FIRST SECURE CONFIGURATION PART AND TRANSMIT EXECUTION REQUEST FOR SW A TO REQUEST CONTROLLER
S210
DEDICATED KEY IS INPUT ?
S212
READ SECOND SECURE CONFIGURATION FROM UI CONTROLLER CONFIGURATION PART
S214
DETERMINE IF DEDICATED KEY INPUT MATCHES WITH SECOND SECURE CONFIGURATION
S216
DEDICATED KEY INPUT MATCHES WITH SECOND SECURE CONFIGURATION ?
S218
TRANSMIT DEDICATED KEY INPUT TO SECOND SECURE CONFIGURATION PART AND TRANSMIT EXECUTION REQUEST FOR SW B TO REQUEST CONTROLLER
S220
TRANSMIT ERROR REPORT TO CPU
S222
END

DEVICE AND METHOD FOR ESTABLISHING TRUSTED PATH BETWEEN USER INTERFACE AND SOFTWARE APPLICATION

CROSS-REFERENCE TO RELATED APPLICATIONS

This application claims the benefit under 35 U.S.C. §119 (a) of Korean Patent Application No. 2005-128934, filed Dec. 23, 2005 in the Korean Intellectual Property Office, the entire disclosure of which is hereby incorporated by reference.

BACKGROUND OF THE INVENTION

1. Field of the Invention

The present invention relates to a device and a method for establishing a trusted path between a user interface and a software application. More particularly, the present invention relates to a device and a method for establishing a trusted path between a user interface and a software application to securely execute the software stored in a memory along the trusted path so as to provide the service desired by the user.

2. Description of the Related Art

Generally, software in devices such as a mobile phone, personal digital assistant (PDA), personal computer (PC) and small sensor can be attacked by hackers and the software may be changed.

In addition, a network host or service provider can not readily inspect remote devices. As such, the network host or service provider can not determine whether the device has been changed by an unauthenticated user's access to software applications provided by the network. Therefore, a technology to check integrity of the device memory is required in the network environment.

Accordingly, there is a need for an improved device and method for establishing a trusted path between a user interface and a software application.

SUMMARY OF THE INVENTION

Exemplary embodiments of the present invention address at least the above problems and/or disadvantages and provide at least the advantages described below. Accordingly, an aspect of the present invention is to provide a device and a method for establishing a trusted path between a user interface and a software application so as to securely execute the software stored in a memory along the trusted path and provide the service desired by the user.

In order to achieve the above-described aspect of the present invention, there is provided a device for establishing a trusted path between a user interface and a software application to execute software corresponding to key input by a user, comprising a user interface (UI) controller for making a request for execution of the software based on the key input by the user, a UI controller configuration part for providing an address of the software corresponding to the key input by the user, a request controller for receiving the software execution request from the UI controller and receiving the software address from the UI controller configuration part, a main memory for storing general software, a secure memory for storing secure software, and a controller for executing the general software or the secure software corresponding to the software address based on the software execution request received from the request controller.

The UI controller comprises a main UI controller for receiving general key input among the key input by the user, and a dedicated UI controller for receiving dedicated key input of a trust button from among several key buttons.

The UI controller configuration part comprises a first secure configuration part for transmitting a first software address corresponding to the general key input to the request controller, and a second secure configuration part for transmitting a second software address corresponding to the dedicated key input to the request controller.

The exemplary general software may comprise a banking program and an update program.

The exemplary secure software may comprise an integrity check program.

In order to achieve the above-described aspect of the present invention, there is also provided a method for establishing a trusted path between a user interface and a software application in a device comprising a first secure configuration part for providing a first software address and a second secure configuration part for providing a second software address according to user's key input, comprising acquiring a software address according to the user's key input and making a request for execution of the software corresponding to the software address, and executing general software or secure software according to the software execution request.

In making the request, the user's key input can be particular key input for the general software execution or dedicated key input for the secure software execution.

In making the request, the first software address corresponding to the particular key input can be acquired from the first secure configuration part, or the second software address corresponding to the dedicated key input can be acquired from the second secure configuration part.

The general software may comprise a banking program, an update program and the like, and the secure software can comprise an integrity check program.

BRIEF DESCRIPTION OF THE DRAWING FIGURES

The above aspect and other features of the present invention will become more apparent by describing in detail exemplary embodiments thereof with reference to the attached drawing figures, wherein;

FIG. 1 is a schematic diagram to show the configuration of a device adopting a method for establishing a trusted path between a user interface and a software application according to an exemplary embodiment of the present invention; and FIG. 2 is a flow chart to describe a method for establishing a trusted path between a user interface and a software application according to an exemplary embodiment of the present invention.

Throughout the drawings, the same drawing reference numerals will be understood to refer to the same elements, features, and structures.

DETAILED DESCRIPTION OF EXEMPLARY EMBODIMENTS

Hereinafter, an exemplary embodiment of the present invention will be described in detail with reference to the accompanying drawing figures.

The matters defined in the description such as a detailed construction and elements are nothing but the ones provided to assist in a comprehensive understanding of the embodiments of the invention and are merely exemplary. Thus, it is apparent that the present invention can be carried out without those defined matters. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

FIG. 1 is a schematic diagram to show a configuration of a device adopting a method for establishing a trusted path between a user interface and a software application according to an exemplary embodiment of the present invention.

The device, according to an exemplary embodiment of the present invention, includes a user interface (UI) device controller 110, a UI controller configuration part 120, a request controller 130, an interface 140, a central processing unit (CPU) 150 and a memory 160.

The UI device controller 110 includes a main UI device controller 112 and a dedicated UI device controller 114. The UI controller configuration part 120 includes a first secure configuration part 122 and a second secure configuration part 124.

In the above configuration, the main UI device controller 112 reads a software (SW) address 1, corresponding to a user's key input for software execution, from the first secure configuration part 122, and transmits the SW address 1 to the request controller 130. In addition, the main UI device controller 112 transmits a request for SW A according to the user's key input (user action 1) to the request controller 130.

The dedicated UI device controller 114 transmits the user's key input of a Trust button, among several key buttons, to the request controller 130. A command to securely execute the software, for the service to be provided to the user, is input through the Trust button. Additionally, the dedicated UI device controller 114 transmits a request for SW B according to the user's dedicated key input (user action 2) to the request controller 130.

The UI device controller 110, for example, can receive input from a keyboard, a fingerprint reader and the like.

The first secure configuration part 122 transmits the first software address (SW address 1) according to the user's key input (user action 1) to the request controller 130. The second secure configuration part 124 transmits the second software address (SW address 2) according to the user's dedicated key input (user action 2) to the request controller 130. The dedicated key input means that the Trust button among several buttons is pressed by the user.

In addition, if the user presses the Trust button from among several buttons, the CPU 150 receives SW address 2 from the request controller 130 through the interface 140, reads software B start data (Start SW B) corresponding to the SW address 2 from the memory 160, and securely executes the corresponding software B according to the Start SW B.

The memory 160 has a main memory 162 and a secure memory 164. The main memory 162 stores general software such as software A and software B. The secure memory 164 stores the first software address of the storing address for the software A and the software A start data (Start SW A) corresponding to the first software address. The secure memory also stores the second software address of the storing address for the software B and the software B start data (Start SW B) corresponding to the second software address. The Start SW A and Start SW B are secure software which is not counterfeit.

FIG. 2 is a flow chart to describe a method for establishing a trusted path between a user interface and software according to an exemplary embodiment of the present invention.

In an exemplary embodiment, the first secure configuration part 122 includes user action 1 which, in this example, is key input by a user of "1367" buttons. The first software address (SW address 1) corresponding to the user action 1 is "OxFFA12".

In addition, in an exemplary embodiment, the second secure configuration part 124 includes user action 2 which, in this example, is key input of the Trust button. The second software address (SW address 2) corresponding to the user action 2 is "OxAAAAB".

Furthermore, in an exemplary embodiment, the software A in the main memory 162 is, in this example, a "banking application" program, and Start SW A data corresponding to the SW address 1 in the secure memory 164 is, in this example, an integrity check program.

Also, in an exemplary embodiment, the software B in the main memory 162 is, in this example, an "update" program received and executed from a server, and Start SW B data corresponding to the SW address 2 in the secure memory 164 is, in this example, an integrity check program.

The UI device controller 110 in the device detects whether there is a key input from the device keypad.

The user performs a key input to execute, for example, the banking application to use banking services, such as checking of automatic transfers or balance inquiries, using devices like a mobile phone. The key input includes a key input, to execute, for example, the banking program, such as the input of the "1367" buttons.

Accordingly, the main UI device controller 112, after execution of the particular key input receives the particular key input to execute the banking program from the device keypad (S202).

The main UI device controller 112 reads the secure configuration from the UI controller configuration part 120 to confirm the particular key input by the user (S204). That is, the main UI device controller 112 reads the secure configuration (user action 1) from the first secure configuration part 122 to confirm the particular key input by the user.

Subsequently, the UI device controller 110 determines if the user's particular key input matches with the secure configuration. That is, the main UI device controller 112 confirms whether the particular key input by the user matches with the user action 1 in the first secure configuration part 122 (S206).

As a result, if the user's particular key input matches with the user action 1 (S208), the main UI device controller 112 transmits the particular key input to the first secure configuration part 122 and transmits an execution request for SW A in the main memory 162 to the request controller 130 (S210). If the user's particular key input does not match with the user action 1, the main UI device controller 112 transmits the error through the request controller 130 to the CPU 150 (S222).

The first secure configuration part 122 transmits the first software address OxFFA12 corresponding to the particular key input to the request controller 130.

The request controller 130 transmits the SW address 1, received from the first secure configuration part 122, and the request for SW A to the CPU 150.

Accordingly, the CPU 150 executes the start SW A data corresponding to the software A in the secure memory 164, based on the SW address 1. The start SW A data are the integrity check program for the "banking application". Therefore, the CPU 150 executes checking the software A, that is, "banking application" stored in the main memory 162 after the integrity check program.

Meanwhile, the user presses the trust button from among several key buttons to perform the dedicated key input (S212). The dedicated key input is performed in order for the user to update the present processing state during banking operation, that is, to input a command to execute an update program. Accordingly, the dedicated key input is performed along the trusted path according to the present invention so as not to expose the processing state of the private banking.

The dedicated UI device controller 114, after execution of the dedicated key input, receives the dedicated key input to execute the update program from the keypad of the device.

The dedicated UI device controller 114 reads the secure configuration from the UI controller configuration part 120 to confirm the dedicated key input by the user (S214). That is, the dedicated UI device controller 114 reads the second secure configuration (user action 2) in the second secure configuration part 124 to confirm the dedicated key input by the user.

Subsequently, the UI device controller 110 determines if the user's dedicated key input matches the secure configuration. That is, the dedicated UI device controller 114 confirms whether the dedicated key input by the user matches the user action 2 in the second secure configuration part 124 (S216).

As a result, if the user's dedicated key input matches with the user action 2 (S218), the dedicated UI device controller 114 transmits the dedicated key input to the second secure configuration part 124 and transmits an execution request for SW B in the main memory 162 to the request controller 130 (S220). If the user's dedicated key input does not match with the user action 2, the dedicated UI device controller 114 transmits the error through the request controller 130 to the CPU 150 (S222).

The second secure configuration part 124 transmits the second software address OxAAAAB corresponding to the dedicated key input to the request controller 130.

The request controller 130 transmits the SW address 2, received from the second secure configuration part 124, and the request for SW B to the CPU 150.

Accordingly, the CPU 150 executes the start SW B data corresponding to the software B in the secure memory 164, based on the SW address 2. The start SW B data are the integrity check program for the "update" program. Therefore, the CPU 150 executes the software B, that is, the "update" program stored in the main memory 162 after the integrity check program.

As described above, the trusted path is established from the user interface via the UI device controller 110, the UI controller configuration part 120, the request controller 130, the interface 140 and the CPU 150 to the memory 160.

As can be appreciated from the above description, the trusted path is established so that attackers can not invade a normal path between the user interface and software. Additionally, the device securely executes the original software which is not fabricated so that the user can receive desired services from the device.

While the invention has been shown and described with reference to certain embodiments thereof, it will be understood by those skilled in the art that various changes in form and details may be made therein without departing from the spirit and scope of the invention as defined by the appended claims and the full scope of equivalents thereof.

What is claimed is:

1. A device for establishing a trusted path between a user interface and a software application, the device comprising:

a user interface (UI) controller for requesting the execution of general software, based on a user key input on the UI;

a UI controller configuration part for reading a software address corresponding to the general software requested by the user key input, and for transmitting the software address;

a request controller for receiving the software execution request from the UI controller and receiving the software address transmitted from the UI controller configuration part;

a memory including a main memory for storing the general software, and a secure memory for storing general software addresses of the main memory and start data of each corresponding general software; and a controller for executing general software by executing the start data of the general software stored in the secure memory, and subsequently executing the general software stored in the main memory based on the software address received by the request controller and the general software addresses stored in the secure memory.

2. The device of claim 1, wherein the UI controller comprises:

a main UI controller for receiving general key input from a user; and a dedicated UI controller for receiving dedicated key input of a trust button from a user.

3. The device of claim 2, wherein the UI controller configuration part comprises:

a first secure configuration part for transmitting a first software address corresponding to the general key input to the controller; and a second secure configuration part for transmitting a second software address corresponding to the dedicated key input to the controller.

4. The device of claim 1, wherein the general software comprises a banking program and an update program.

5. The device of claim 1, wherein the start data comprises an integrity check program.

6. A method for establishing a trusted path between a user interface and a software application in a device comprising a first secure configuration part for providing a first software address and a second secure configuration part for providing a second software address according to key input, the method comprising:

receiving, from a user interface (UI) controller, a request for execution of general software when a key to execute the general software is input by a user on the UI;

acquiring, from a UI controller configuration part, a software address corresponding to the general software requested by the user input;

transmitting the request for execution of the general software and the software address corresponding to the general software requested by the user input; and executing general software by executing start data of the general software stored in a secure memory, and subsequently executing the general software stored in main memory based on the software address received and general software addresses stored in the secure memory.

7. The method of claim 6, wherein the acquiring comprises at least one of acquiring a first software address corresponding to the key input from the first secure configuration part, and acquiring a second software address corresponding to a dedicated key input from the second secure configuration part.

8. The method of claim 6, wherein the general software comprises a banking program or an update program.

9. The method of claim 6, wherein the start data of the general software comprises an integrity check program.

10. The device of claim 1, further comprising a second UI controller for making a request for execution of software based on a dedicated key input; and a second UI controller configuration part for providing an address of the software corresponding to the dedicated key input.

* * * * *